(12) United States Patent
Keller et al.

(10) Patent No.: US 9,384,310 B1
(45) Date of Patent: Jul. 5, 2016

(54) VIEW DATA SHARING FOR EFFICIENT MULTI-MODE MULTI-CORNER TIMING ANALYSIS

(71) Applicant: Cadence Design Systems, Inc., San Jose, CA (US)

(72) Inventors: Igor Keller, Pleasanton, CA (US); Jijun Chen, San Jose, CA (US); Pradeep Yadav, Greater Noida (IN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 14/502,611

(22) Filed: Sep. 30, 2014

(51) Int. Cl.
*G06F 17/50* (2006.01)

(52) U.S. Cl.
CPC ........ *G06F 17/5031* (2013.01); *G06F 2217/84* (2013.01)

(58) Field of Classification Search
CPC .................................................. G06F 17/5031
See application file for complete search history.

(56) References Cited

U.S. PATENT DOCUMENTS

| | | | |
|---|---|---|---|
| 7,243,313 B1* | 7/2007 | Qin et al. ....................... | 716/113 |
| 2003/0204828 A1* | 10/2003 | Iwanishi ........................... | 716/6 |
| 2005/0172250 A1* | 8/2005 | Kucukcakar et al. ............. | 716/6 |
| 2009/0216359 A1* | 8/2009 | McConaghy ....... | G06F 17/5036 700/103 |
| 2009/0217226 A1* | 8/2009 | Cui ..................... | G06F 17/5031 716/113 |
| 2014/0189634 A1* | 7/2014 | Tsai et al. ..................... | 716/134 |

* cited by examiner

*Primary Examiner* — Vuthe Siek
*Assistant Examiner* — Aric Lin
(74) *Attorney, Agent, or Firm* — Kenyon & Kenyon LLP

(57) ABSTRACT

A system and method for performing multi-mode multi-corner (MMMC) analysis such that multiple views or conditions can be analyzed together to improve runtime by taking advantage of common steps of analysis in different corners. Views are clustered based on their similarity to one another to take advantage of calculations and other tasks that may be shared between views during timing analysis. Then, during timing analysis, each net in the design is analyzed for each view.

16 Claims, 5 Drawing Sheets

200

205

300

400

510

VIEW DATA SHARING FOR EFFICIENT MULTI-MODE MULTI-CORNER TIMING ANALYSIS

BACKGROUND

Aspects of the present invention relate generally to the field of circuit design and test, and more specifically to static timing analysis and simulation of electronics.

Integrated circuit (IC) design is increasingly complex, sometimes involving millions of elements, shapes or geometries, and may be facilitated with an electronic design automation (EDA) tool that allows a designer to interactively position ("place") and connect ("route") various shapes on the circuit. The EDA tool then creates a circuit layout containing the physical locations and dimensions of the circuit's components, interconnections, and various layers from the original design that may then be fabricated, creating the IC. The designed IC is eventually fabricated by transferring or printing the circuit layout to a semiconductor substrate in a series of layers that collectively will form the features that constitute the devices that make up the components of the integrated circuit.

After or during the design and creation of an IC layout, validation, optimization, and verification operations are performed on the IC layout using a set of testing, simulation, analysis and validation tools. These operations are conventionally performed in part to detect and correct placement, connectivity, and timing errors. For example, as part of the verification, the IC layout may undergo circuit simulation and analysis where the signals between components are tested, for example using static timing analysis (STA) or gate level simulation (GLS).

STA is a method for assessing the timing of a digital circuit using software techniques and certain models that provide relevant characteristics of the circuit design. During STA, models of the expected timing of a digital circuit are created by estimating the expected delay within the circuit, for example, via the anticipated worst case signal path, without requiring a lengthy and cost prohibitive full simulation of the circuit. To accurately estimate the timing of the design, the effects of interference from neighboring nets (aggressors) on each victim net may be estimated.

The behavior of an electronic circuit often depends on various conditions such as temperature or local voltage variations. Consequently, circuit designers typically verify their design under several different conditions, or views, by performing STA for each of the potential different conditions. Each view may have multiple factors, including a constraint file that defines the mode for simulating a condition, for example for a low power or high temperature condition; a library file; and parameters for a resistor-capacitor (RC) reduction, whereby the resistance and capacitance of a network of components and elements are reduced or simplified mathematically. Then to complete the STA, the timing delay of the circuit must be separately calculated for each set of factors, for example, for each unique combination of RC reduction, library file, and input waveform. A distinct factor is sometimes referred to as a corner. Therefore, performing a complete multi-view analysis of even a relatively simple design is excessively time and resource consuming.

Accordingly, there is a need in the art to improve the efficiency of the timing tests across multiple views.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

During multi-mode multi-corner (MMMC) analysis, multiple sets of factors can be analyzed together to improve runtime by taking advantage of common steps of analysis in different corners. However, in order to reuse the results of a single analysis across multiple sets of factors, the shared analysis is conventionally limited to tests that have identical input waveforms with either a base delay or infinite timing window. Thus there is currently no known solution that takes advantage of other aspects of the testing process that may overlap between corners. According to an embodiment, views are clustered to take advantage of calculation and tasks that may be shared between views during timing analysis.

Figure 1:
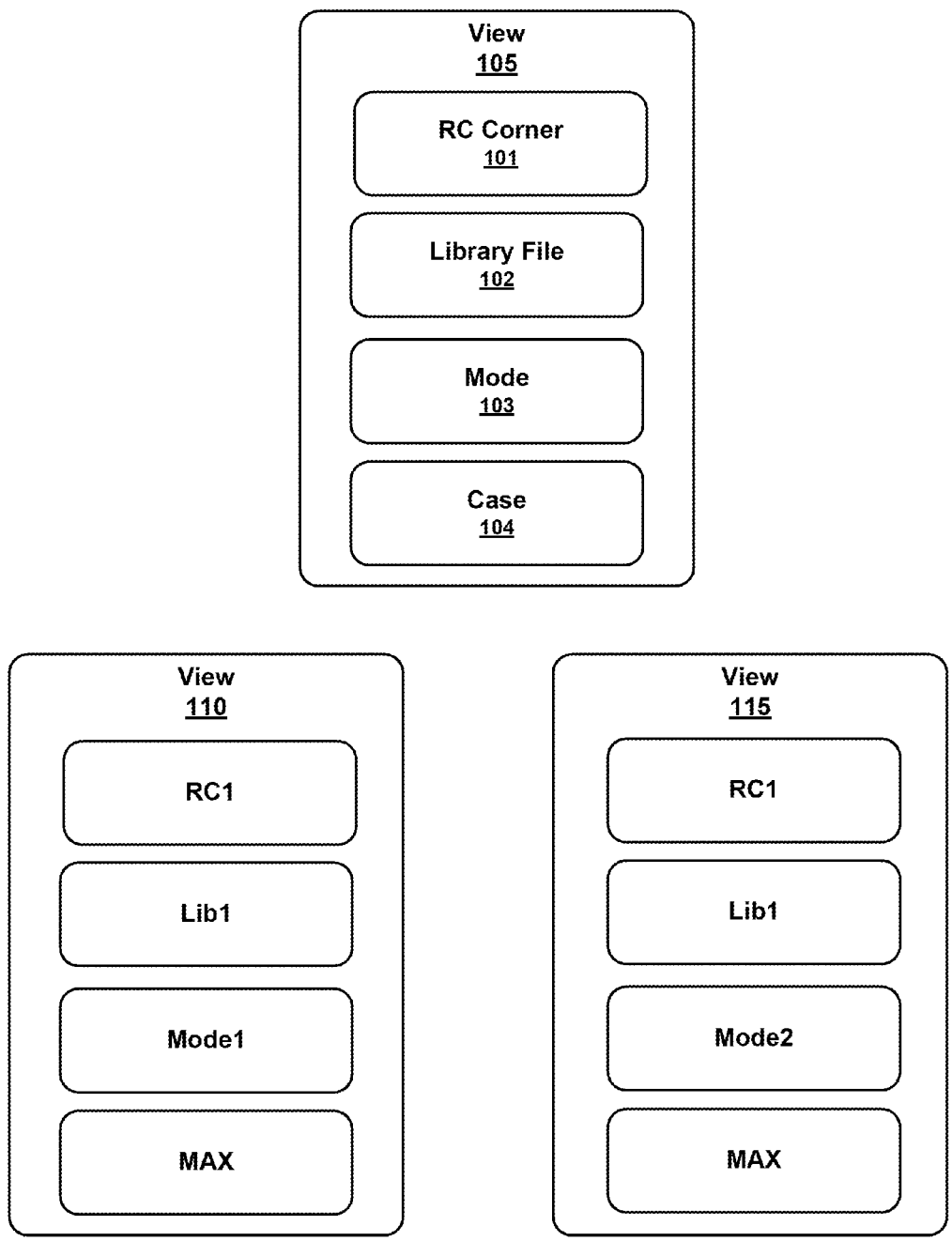
FIG. 1 illustrates an exemplary set of views for analysis according to an embodiment of the present invention.

FIG. 1 illustrates an exemplary set of views for analysis according to an embodiment of the present invention. As shown in FIG. 1, a view definition 105 may include an RC corner identifying a set of parameters for RC reduction 101, a library file 102, a mode 103, and a case selection 104 (e.g., maximum delay, minimum delay, average delay, etc.). Then a first view 110 may include an RC corner RC1, a library file Lib1, a mode Mode1, and a case MAX. Similarly, a second view 115 may include an RC corner RC1, a library file Lib1, a mode Mode2, and a case MAX. Therefore, because the first view 110 and the second view 115 are identical except for the mode being tested in each view, after the first view 110 is tested, the second view 115 can use portions of the analysis and testing results from the first view 110. Thus complete results for the second view 115 can be achieved without completing full testing and analysis on the second view 115.

Figure 2A:
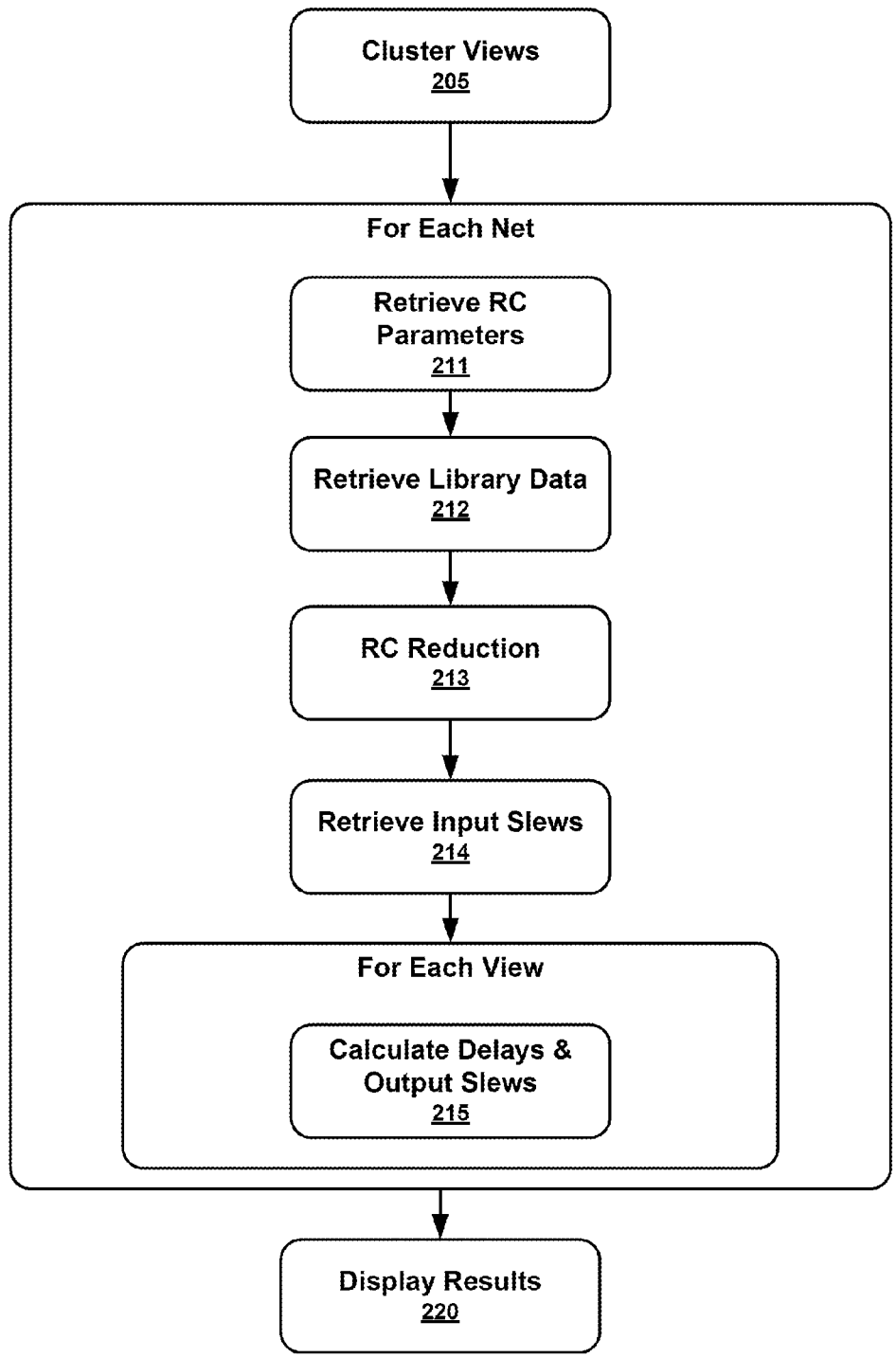
FIG. 2(A) illustrates an exemplary method for improving the efficiency of MMMC testing according to an embodiment of the present invention.

FIG. 2(A) illustrates an exemplary method for improving the efficiency of MMMC testing according to an embodiment of the present invention. As shown in FIG. 2, the similarities among different views are leveraged to improve the efficiency of MMMC testing. According to an embodiment, using an analysis tool, an exemplary system can expedite analysis of multiple views for a design according to the methods described herein.

In FIG. 2(A), for each net, a delay for each view is calculated, with the views clustered by similar properties for reuse of the analysis results. For example, initially, the views are separated into groups, or clustered, to limit memory requirements by promoting reuse of certain results (block 205).

Views of a design may be clustered together according to the amount of information that can be shared between the views. Within a cluster, information may be shared between views to varying degrees according to the classification of the cluster. For example, according to an embodiment, a pair of views may have similarities that can be assigned to one of three classes: full-shared, full-shared-unconstrained, and base-delay-shared.

A cluster of views is classified as full-shared when the views have input waveforms, RC corners, and library files that are all the same. Then, if the views are analyzed with a base delay or with infinite timing windows, the complete results from a first view may be shared for equivalent arcs in a second view of the cluster. The term arc, as used herein, is used to describe a timing path between two pins in a circuit design. The timing analysis will include an analysis of various arcs between inputs and outputs of a circuit block.

A cluster of views is classified as full-shared-unconstrained when the RC corners and library files and the aggressor nets in each of the clustered views are the same. For example, the aggressor nets may be unconstrained and all active or the same set of aggressor nets may be chosen and constrained in the same way for each view. Then the complete results of the analysis may be shared between the views.

A cluster of views is clustered as base-delay-shared when the input waveforms and RC corners are the same but the modes assigned to each view are different. Then the base delay results of the timing analysis for one view can be shared between the other views in the cluster.

Figure 2B:
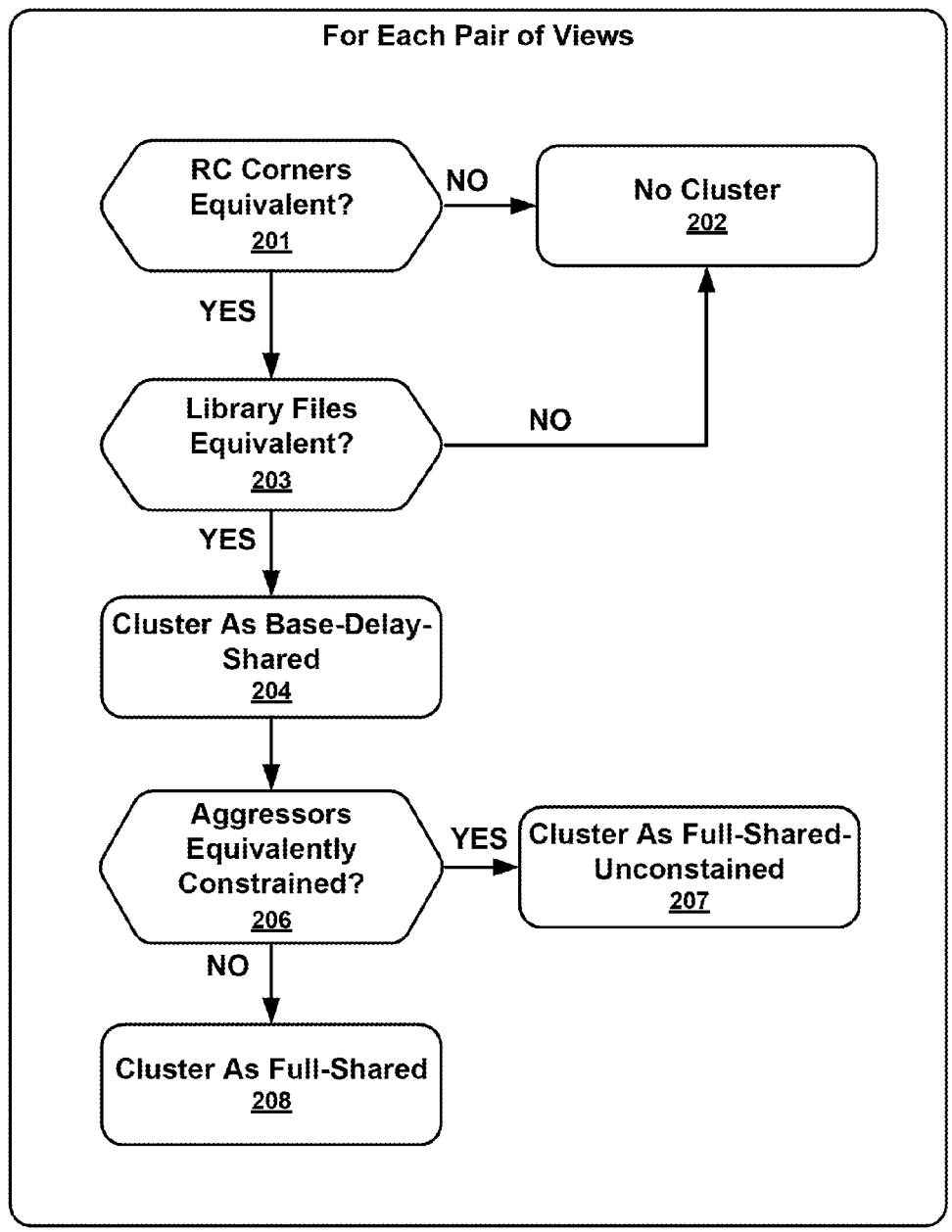
FIG. 2(B) illustrates an exemplary method for clustering views according to an embodiment of the present invention.

FIG. 2(B) illustrates an exemplary method 205 for clustering views according to an embodiment of the present invention. As shown in FIG. 2(B), the factors of each view may be analyzed to identify an appropriate classification. Preliminarily, the RC corners between two views may be compared (block 201). If the RC corners are not the same, then the two views will not be clustered (block 202). If the RC corners are the same, then the library files of the two views may be compared (block 203). If the library files are not the same, then the two views will not be clustered (block 202). If the library files are the same, the views may be classified as base-delay-shared and the results of a base delay analysis may be shared for identical input waveforms (block 204). If the library files are the same, and the aggressor nets are constrained in the same way in both views (block 206), the views may be classified as full-shared-unconstrained (block 207). If the aggressor nets are the same but not always constrained in the same way, the views may be classified as full-shared and the results of a base delay analysis or part of the signal integrity analysis (but not all) may be shared for identical arcs (block 208). The aggressors may not be constrained the same way when two views have different timing windows for an aggressor. The timing windows constitute constraints within which a search for the worst-case alignment of aggressors is conducted. Results for any combination of alignments of aggressors found for one view which does not violate a constraint of the other view can be reused when the views are classified as full-shared.

Additionally, once analysis begins on the cluster of views, if it becomes apparent that two or more views were improperly clustered, for example, because the analysis results that can accurately and properly be shared among the views is less than anticipated, the views may be re-clustered and/or reclassified. For example, two views may be initially clustered with a full-shared-unconstrained classification. However, during the analysis, it may become known that the aggressor nets for the two views are not as similar as originally anticipated. The pair of views may then be reclassified as full-shared.

Then, referring again to FIG. 2(A), once a set of views have been clustered, each net within the tested design may be analyzed over the multiple views of the cluster. Such testing may include retrieving the parameters for RC reduction for each RC corner of the cluster (block 211) and retrieving the library file for each view in the cluster (block 212). It will be understood that where the RC corners are identical between clustered views, the relevant RC corner only needs to be retrieved and loaded once for all the views in the cluster. For example, any two clustered views will have equivalent RC corners and retrieval of the RC parameters will occur only once for the cluster. Similarly, for a cluster classified as full-shared or full-shared-unconstrained, the library files for all views in the cluster will have equivalent library files. Therefore the library file needs to be retrieved only once for the cluster.

The parameters and files may be retrieved from a memory storing the information necessary for running the tests and loaded into an analysis tool. The memory may be organized, for example, as a relational database or other memory structure storing the factors for each view.

Then, once the analysis tool has the information necessary, the analysis tool can perform the RC reduction (block 213), retrieve the input slews for each corner from the memory (block 214), and calculate the delay responses for each unique combination of RC reduction, library file, and slew in the clustered views (block 215). Where the delay has already been calculated for another view of the cluster for a unique combination, the results will already exist in memory and need not be calculated again. Based on the clustering classification, the analysis tool will know to check for the stored results. For some views, the input slews are sufficiently similar that the delay results and output slews for one view can be interpolated from the delay results of a second view. The calculated delays and output slews may then be presented on a timing graph for display and further evaluation (block 220).

This method has the additional benefit that if sufficient processing resources are available, the analysis of two or more nets may be processed simultaneously, in parallel.

Although primarily described with respect to sharing results between views, tasks performed during the analysis of a single view may also share results for more efficient analysis. Additionally, although only three levels of classification have been described herein, other clusters may be considered.

Figure 3:
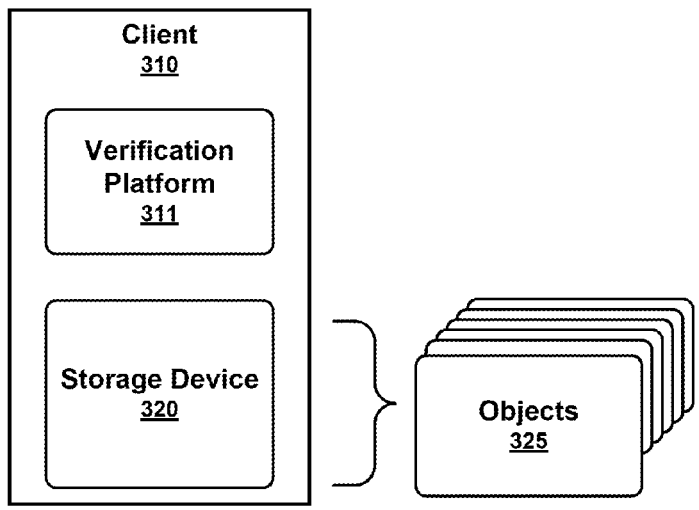
FIG. 3 is a simple block diagram illustrating components of an exemplary system according to an embodiment of the present invention.

A user or designer may access an analysis tool to model and analyze a design in a standalone client system, client-server environment, or a networked environment. FIG. 3 is a simple block diagram illustrating components of an exemplary system 300 according to an embodiment. As shown in FIG. 3, a system 300 may comprise a client 310 executing an analysis tool 311 and having a memory storage 320. The client 310 may be any computing system that executes an analysis tool 311 or otherwise facilitates access to memory storage 320, for example a personal computer. The client 310 may include a processor that performs a method in accordance with the disclosed embodiments. Such a client would be part of an overall test system in accordance with the disclosed embodiments.

Hardware models, instruction sets, software packages, timing files, netlists and other objects 325 used by the analysis tool 311 may be stored in memory storage 320. A user may access the objects 325 stored in memory storage 320 with the client 310 via the analysis tool 311, where the analysis tool 311 is capable of accessing memory storage 320 and displaying the objects 325 and the data associated with the timing analysis. The analysis tool 311 may include a user interface, for example a program, application or middleware that acts as a frontend to and facilitates access to objects in memory storage 320. The analysis tool 311 may facilitate executing STA using the tools and procedures described herein. The user may interact with the analysis tool 311 through a number of input devices, such as by inputting a selection as with a mouse or inputting a request as with a keyboard. The user may observe the analysis results on an output device or display. The analysis tool 311 may run in an application window controlled by the user.

As shown in FIG. 3, a client 310 may be a stand-alone system, as may be of particular interest where the components being simulated are highly confidential. Additionally, according to an aspect of an embodiment as shown in FIG. 4, a client 410 may be part of a networked environment.

Figure 4:
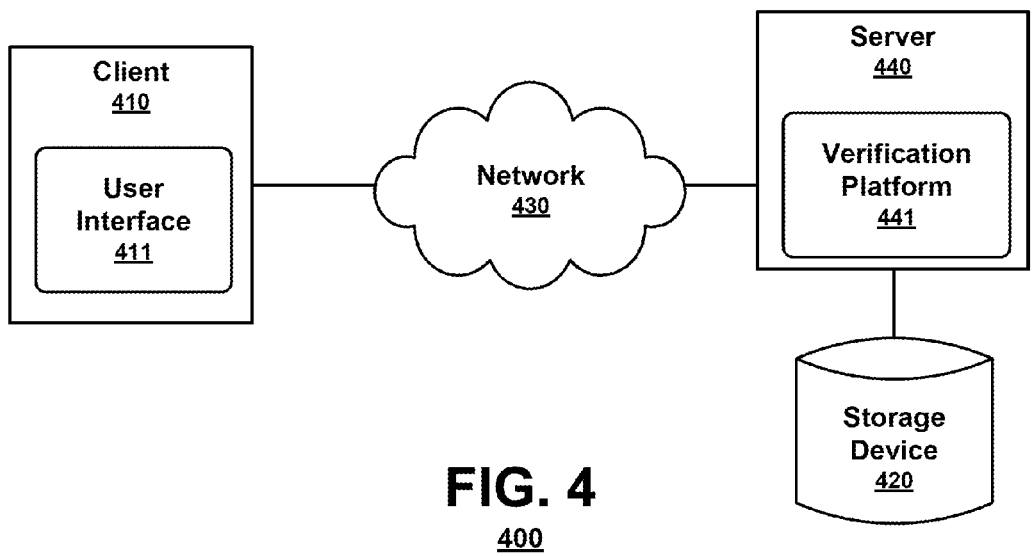
FIG. 4 is a simple block diagram illustrating components of an exemplary system according to an embodiment of the present invention.

FIG. 4 is a simple block diagram illustrating components of an exemplary system 400 according to an embodiment. As shown in FIG. 4, system 400 may include a client 410 having a user interface 411. The client 410 may be connected to a server 440 via a network 430. The analysis tool 441, which in this embodiment is located at server 440, may have access to storage device 420 storing hardware models, instruction sets, software packages, timing files, netlists and other objects utilized by the analysis tool 441. The server 440 may include a processor that performs a method in accordance with the disclosed embodiments. Such a server then would be part of an overall test system in accordance with the disclosed embodiments.

A user may access an analysis tool 441 at the server 440 via the client 410 having a user interface 411 capable of accessing and displaying the design and the results of the STA. The client 410 may be any computing system that facilitates the user accessing storage device 420, for example a personal computer. The network 430 may be a wired or wireless network that may include a local area network (LAN), a wireless network, the Internet, or any other network available for accessing storage device 420 from the client 410.

The server 440 may be a network server accessible to the client 410 via the network 430 that may manage access to storage device 420. The user interface 411 may receive instructions regarding testing a design from the user and utilizing the objects stored in memory storage 420, facilitate a display of the analysis or the information gathered during the analysis. Multiple different clients (not shown) may access storage device 420 via the network 430 and request access to the objects stored therein.

In another networked environment, the analysis tool may be executed on a network capable client and access the models, packages and other objects stored in one or more storage devices via a network and communications server.

Figure 5:
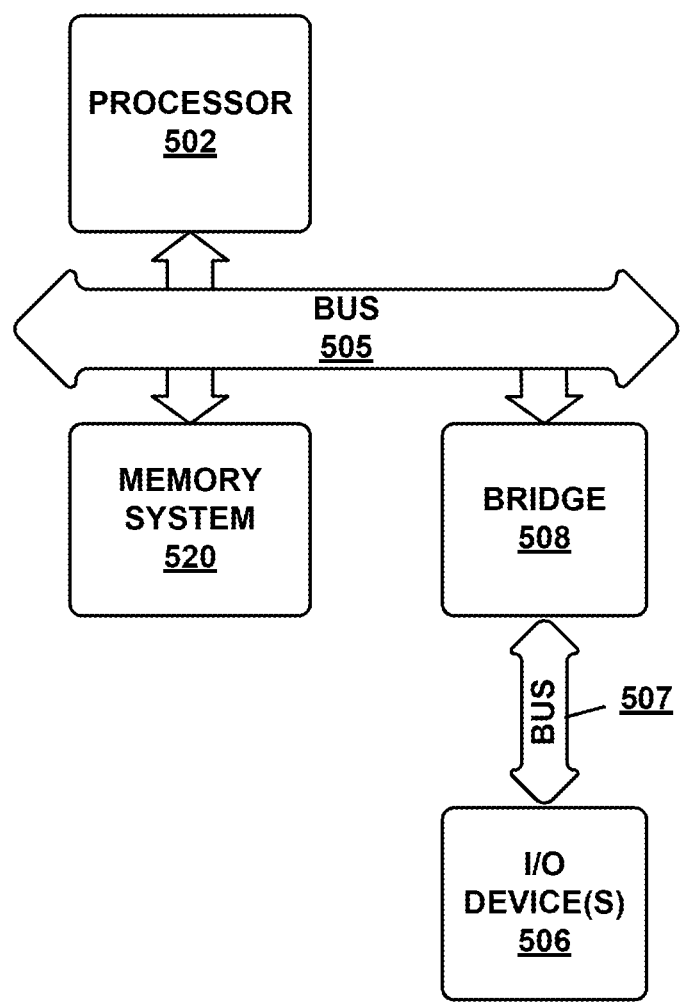
FIG. 5 is a simple block diagram illustrating components of an exemplary client according to an embodiment of the present invention.

FIG. 5 is a simple block diagram illustrating components of an exemplary client 510 according to an embodiment of the present invention. As shown in FIG. 5, the client 510 configured to execute the analysis tool as described herein may include a processor 502, a memory system 520 and one or more input/output (I/O) devices 505 in communication. The communication can be implemented in a variety of ways and may include one or more computer buses 505, 507 and/or bridge devices 508 as shown in FIG. 5. The I/O devices 505 can include network adapters and/or mass storage devices from which the client 510 can receive commands for executing the simulation.

As shown in FIG. 3, a client 510 may be a stand-alone system, as may be of particular interest where the components being simulated are highly confidential. Additionally, according to an aspect of an embodiment as shown in FIG. 4, a client 510 may be part of a networked environment.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units. Additionally, it is noted that the arrangement of the blocks in FIG. 2 do not necessarily imply a particular order or sequence of events, nor are they intended to exclude other possibilities. For example, the operations depicted at blocks 211 and 212 may occur in an alternate order or substantially simultaneously with each other. Such implementation details are immaterial to the operation of the present invention unless otherwise noted above.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for testing the timing of an integrated circuit design comprising:
   on a computer device having a processor configured to implement a simulator to test timing for the design for a plurality of conditions for each net in the design:
   identifying at least one of RC corners, library files, aggressor net constraints, and aggressor timing windows of each of two or more conditions of the plurality of conditions;
   comparing the at least one of RC corners, library files, aggressor net constraints, and aggressor timing windows of the two or more conditions;
   grouping the two or more conditions into a cluster based on the comparison, wherein, for the cluster:
   loading, into the simulator, (i) RC parameters and (ii) one or more library files for the net;
   performing, with the simulator, an RC reduction according to one or more restrictions as required by the two or more conditions in the cluster;
   loading, into the simulator, a plurality of input slews; and
   calculating, with the simulator, for at least one condition of the two or more conditions in the cluster, a timing delay and an output slew for the net based on the plurality of input slews, wherein a result of at least one calculation is stored in memory and at least one of the timing delay and the output slew of the stored result is used to represent at least one of a timing delay and an output slew of another condition of the two or more conditions in the cluster.

2. The method of claim 1, wherein the cluster of conditions share a common RC corner.

3. The method of claim 2, wherein the cluster of conditions share a common library corner.

4. The method of claim 3, wherein for identical input waveforms, the base delay results of the calculation are shared between conditions.

5. The method of claim 4, wherein a part of a signal analysis for equivalent arcs is shared between conditions.

6. The method of claim 3, wherein the cluster of conditions have equivalent aggressor nets.

7. The method of claim 6, wherein the complete results of the calculation are shared between conditions.

8. A method for testing the timing of an integrated circuit design comprising:
on a computer device having a processor configured to implement a simulator to test timing for the design for a plurality of conditions for each net in the design:
grouping two or more of the plurality of conditions into a cluster based on similarities between the conditions, said grouping including identifying and comparing at least one of RC corners, library files, aggressor net constraints, and aggressor timing windows for each condition;
loading RC parameters for the net into the simulator;
loading one or more library files for the net as required by the plurality of conditions in the cluster;
performing RC reduction according to one or more restrictions as required by the plurality of conditions in the cluster;
loading a plurality of input slews into the simulator to test the plurality of conditions; and
for each condition in the plurality of conditions, calculating a timing delay and output slew for the net, wherein (i) a result of at least one calculation is stored in memory and based on said grouping, the stored result is reused for the plurality of conditions in the cluster to reduce the number of calculations performed during the testing and (ii) during calculation of the timing delay, re-clustering one or more of the plurality of conditions into a new cluster.

9. A non-transitory computer readable medium storing instructions that when executed by a processor perform a method of testing timing for a plurality of conditions for an integrated circuit design, the method comprising:
for each net in the design:
identifying at least one of RC corners, library files, aggressor net constraints, and aggressor timing windows of each of two or more conditions of the plurality of conditions;
comparing the at least one of RC corners, library files, aggressor net constraints, and aggressor timing windows of the two or more conditions;
grouping the two or more conditions into a cluster based on the comparison, wherein, for the cluster:
loading, into the simulator, (i) RC parameters and (ii) one or more library files for the net;
performing, with the simulator, an RC reduction according to one or more restrictions as required by the two or more conditions in the cluster;
loading, into the simulator, a plurality of input slews; and
calculating, with the simulator, for at least one condition of the two or more conditions in the cluster, a timing delay and an output slew for the net based on the plurality of input slews, wherein a result of at least one calculation is stored in memory and at least one of the timing delay and the output slew of the stored result is used to represent at least one of a timing delay and an output slew of another condition of the two or more conditions in the cluster.

10. The non-transitory computer readable medium of claim 9, wherein the cluster of views share a common RC corner.

11. The non-transitory computer readable medium of claim 9, wherein the cluster of conditions share a common library corner and for identical input waveforms the base delay results of the calculation are shared between conditions.

12. The non-transitory computer readable medium of claim 11, wherein the cluster of conditions have equivalent aggressor nets and the complete results of the calculation are shared between conditions.

13. A system comprising:
a memory to store an integrated circuit design; and
a processor configured to test timing for the design by, for each net in the design:
identifying at least one of RC corners, library files, aggressor net constraints, and aggressor timing windows of each of two or more conditions of the plurality of conditions;
comparing the at least one of RC corners, library files, aggressor net constraints, and aggressor timing windows of the two or more conditions;
grouping the two or more conditions into a cluster based on the comparison, wherein, for the cluster:
loading, into the simulator, (i) RC parameters and (ii) one or more library files for the net;
performing, with the simulator, an RC reduction according to one or more restrictions as required by the two or more conditions in the cluster;
loading, into the simulator, a plurality of input slews; and
calculating, with the simulator, for at least one condition of the two or more conditions in the cluster, a timing delay and an output slew for the net based on the plurality of input slews, wherein a result of at least one calculation is stored in memory and at least one of the timing delay and the output slew of the stored result is used to represent at least one of a timing delay and an output slew of another condition of the two or more conditions in the cluster.

14. The system of claim 13, wherein the cluster of conditions share a common RC corner.

15. The system of claim 14, wherein the cluster of views share a common library corner and for identical input waveforms the base delay results of the calculation are shared between conditions.

16. The system of claim 15, wherein the cluster of conditions have equivalent aggressor nets and the complete results of the calculation are shared between conditions.

* * * * *